United States Patent

Luijk et al.

[15] 3,644,248

[45] Feb. 22, 1972

[54] PROCESS FOR PREPARING A NOVEL THERMOPLASTIC RUBBER AND NOVEL THERMOPLASTIC RUBBER COMPOSITION

[72] Inventors: Pieter Luijk; Evert Van Gelderen; Gervinus P. Schipper, all of Delft, Netherlands

[73] Assignee: Shell Oil Company, New York, N.Y.

[22] Filed: June 13, 1969

[21] Appl. No.: 833,154

[30] Foreign Application Priority Data

July 4, 1968 Great Britain.......................31,986/68

[52] U.S. Cl................ 260/23.7 M, 260/23.7 R, 260/32.6 A, 260/41.5 R, 260/78.4 D
[51] Int. Cl. .......................................................C08f 27/00
[58] Field of Search....................260/23.7 M, 31.8 DR, 23.7, 260/78.4 D, 768, 23.7 B

[56] References Cited

FOREIGN PATENTS OR APPLICATIONS 583,237 9/1959 Canada

OTHER PUBLICATIONS

Rubber Chemistry and Technology (1946) pages 313– 320, 322– 328, cited as LeBras et al.

Primary Examiner—Donald E. Czaja
Assistant Examiner—Donald J. Barrack
Attorney—William H. Myers and Joseph W. Brown

[57] ABSTRACT

A polyisoprene rubber derivative having the properties of a thermoplastic elastomer is prepared by reaction of polyisoprene with maleic anhydride and subsequent reaction with a fatty acid salt of a Group II or IV metal such as zinc stearate.

9 Claims, No Drawings

PROCESS FOR PREPARING A NOVEL THERMOPLASTIC RUBBER AND NOVEL THERMOPLASTIC RUBBER COMPOSITION

The invention relates to a process for preparing a novel thermoplastic rubber, a process for preparing articles in which use is made of a novel thermoplastic rubber, and articles prepared by this process.

Rubbers and elastomers of either natural or synthetic origin require a vulcanization treatment in order to obtain optimum elastomeric strength properties. By vulcanization the rubber alters irreversibly in properties.

Vulcanization may be effected by heating the rubbers in the presence of vulcanizing agents, for example, sulfur, sulfur compounds, and peroxides, for example, in a mold, in which before heating the rubbers are compounded, if desired, with extenders and reinforcing agents. It is also possible to vulcanize the rubbers by irradiation. It has been found that in the molding of many articles applying a vulcanization treatment the losses of vulcanized rubber may be unduly large. The scrap material left from the molding operation is largely unusable except as a filler or reclaim for new rubber compositions. In other words, it cannot be readily remolded, since it is in a relatively intractable state with respect to the workability or reprocessing.

Thermoplastics do not possess this latter disadvantage. Any scrap material obtained in the course of forming extrudates or moldings from a thermoplastic may be simply plastified and reused in the same or different extruding or molding operation. In many instances this would be an exceedingly valuable property for a rubber composition to possess.

Various attempts have been made to prepare thermoplastic rubbers which are meant in this description and the claims to be synthetic elastomers which have at normal temperature the same strength as vulcanizates without being vulcanized, and may be reversibly plastified.

It will be noted that a substance is an elastomer, if it fulfills the definition as given in ASTM Special Technical Publication No. 184:

"A substance that can be stretched at room temperature to at least twice its original length and, after having been stretched and the stress removed, returns with force to approximately its original length in a short time."

It is known that polybutadiene may be converted into a thermoplastic rubber by carboxylating it and then cross-linking the carboxylated polymer chains via metal ions. The product of this known process essentially differs from a conventional vulcanizate. It possesses at normal temperature high strength properties and behaves like a conventional elastomeric vulcanizate, becomes soft and easily processable by heating and regains its strength and elastomeric properties by cooling. In the known process for modifying polybutadiene organic sulfur containing acids, such as thioglycolic acid, alpha- and beta-mercaptopropionic acids, and mercapto-succinic acid, are used as carboxylating agents, and metal salts of organic fatty acids, such as zinc stearate, zinc oleate, magnesium oleate, and lead oleate, preferably together with metal oxides of potassium, magnesium, calcium, barium, cadmium, zinc, and aluminum, as cross-linking agents.

Furthermore, it is known to modify certain characteristics of elastomers, for example, to raise their melting point or to make them insoluble in certain solvents, by applying a treatment analogous to the vulcanization treatment by means of heating with sulfur or sulfur compounds. In this known process various polymers, e.g., polyisobutenes, polyisoprenes, polybutadienes and copolymers of ethylene and of propylene, may be modified by treating them with maleic anhydride and then with magnesium or zinc oxide. These treating agents, the unsaturated dicarboxylic anhydride and the metal oxide, react on the polymers in a sense analogous to vulcanization.

Now, it has been found that a novel thermoplastic rubber may be prepared from polyisoprene without vulcanizing this starting material by using maleic anhydride and compounds of divalent metals of the Groups II and IV of the Periodic Table of the elements.

In accordance with the invention a process is provided for preparing a novel thermoplastic rubber, which comprises reacting polyisoprene with maleic anhydride in an amount in the range of from 0.1 to 20 percent by weight, calculated on the weight of polyisoprene, in the absence of water and without effecting any vulcanization contacting the reaction product thus obtained with at least one salt of a divalent metal of the groups II and IV of the Periodic Table of the elements with a saturated or unsaturated fatty acid containing 10 to 20 carbon atoms, and/or with compounds from which this divalent metal salt may be formed during their contact with the polyisoprenemaleic anhydride reaction product, the divalent metal salt or a divalent metal-containing precursor thereof being present in an amount equivalent to 0.1 to 50 moles of divalent metal per mole of bound maleic anhydride.

By the expression "in the absence of water" is to be understood the presence of water in an amount of less than that which would be necessary in order to convert the total amount of maleic anhydride used for reacting with polyisoprene into maleic acid. By "the Groups II and IV of the Periodic Table of the elements" is meant the Groups IIA, IIB, IVA, and IVB of the Periodic Table of the elements disclosed in Handbook of Chemistry and Physics, 45th edition, 1964–1965, published by the Chemical Rubber Co., Cleveland, Ohio, U.S.A., page B–2.

The bound maleic anhydride content of the polyisoprene-maleic anhydride adduct obtained by reacting polyisoprene with maleic anhydride in the process according to the invention may be determined after dissolving the adduct in a suitable solvent, e.g., benzene, by titration with sodium methylate.

Furthermore, the invention provides a novel thermoplastic rubber on the basis of a polyisoprene-maleic anhydride adduct in which maleic anhydride is present in an amount in the range of from 0.1 to 20 percent by weight, calculated on the weight of polyisoprene present in the adduct, together with at least one divalent metal of the Groups II and IV of the Periodic Table of the elements in an amount of 0.1 to 50 moles per mole of bound maleic anhydride.

The polyisoprene-maleic anhydride adduct may be obtained by a solution process. This process is started with polyisoprene dissolved in a suitable organic solvent. This solution of polyisoprene may be obtained by solution polymerization of isoprene in a solvent containing one or more olefinic hydrocarbons, particularly acyclic alkenes having from three to 10 carbon atoms, for example, propene, the butenes, the pentenes, and the hexenes. It is preferred that a solution of polyisoprene is used which is obtained by solution polymerization in which it is started from a mixture containing isoprene and mono-olefins which mixture is obtained by dehydrogenating one or more hydrocarbons with five carbon atoms per molecule. However, it is also possible to use a solution of polyisoprene in methyl isobutyl ketone or methyl ethyl ketone. A suitable stabilizer may be added to the solution of polyisoprene. 2,6 Ditertiary 4-methyl phenol and a polymerized quinoline derivative have been found to be effective. Maleic anhydride, dissolved in a suitable solvent is then added and the solution heated to 100° C. A radical initiator is then added slowly and the reaction allowed to proceed. Paramenthane hydroperoxide, benzoyl peroxide, diazo-amino-benzene and azo-bis-isobutyronitrile are suitable radical initiators. To precipitate the polyisoprene-maleic anhydride adduct, the solution is cooled to room temperature and ethanol is added. The precipitate may be dried in vacuo.

Preferably the reaction of polyisoprene with maleic anhydride is conducted in a solid phase at high temperature by feeding the polyisoprene to a mixer, masticating it therein at a temperature between 50° C. and 300° C., preferably between 150° C. and 250° C., and injecting into the polyisoprene during, or immediately subsequent to, the mastication a solution of maleic anhydride, the polyisoprene mass being reacted with maleic anhydride. By "mastication" of polyisoprene is meant the subjection of polyisoprene to shearing forces. The mastication residence time during which adduct formation is effected may vary from about 30 seconds to about 30 minutes, but from 2 to 10 minutes is the preferred effective range. Mixers, such as those of the Banbury type, may be used, as well as continuous mixers of the more complicated type. A continuous mixer consists essentially of a supply and transportation zone with a feed orifice into which the polyisoprene is supplied and in which it is plastified, and a mixing zone through which the polymer mass is transported being simultaneously subjected to shearing forces. This causes the polyisoprene mass to be masticated and a solution of maleic anhydride in a suitable solvent is supplied to this mass, which solvent is dispersed through the polymer mass. This causes the reaction of polyisoprene with maleic anhydride to proceed, whereupon the polyisoprene-maleic anhydride adduct can be taken off.

In the reaction process of polyisoprene with maleic anhydride the use of a continuous screw extruder as continuous mixer has been shown to be very suitable.

This continuous mixer may be provided with a feed port, an extrusion orifice, and an injection opening. Various zones can be distinguished in the apparatus, viz, a supply zone, a transportation zone with a transport screw having a constant pitch, a blister zone, and a mixing zone in which a spindle is present provided with gear shaped mixing elements. Polyisoprene is supplied to the feed port and forwarded by means of the transport screw via the supply zone through the transportation zone to the blister zone. In the transportation zone the polyisoprene mass is plastified by heating. By the blister in the blister zone the mass is subjected to high shearing forces. Subsequently the polyisoprene mass passes into the mixing zone in which the polyisoprene mass is mixed intimately with a solution of maleic anhydride which is injected through the injection opening into the polyisoprene mass. In the mixing zone the polyisoprene is masticated by the gear shaped mixing elements, while it is in intimate contact with the maleic anhydride solution by which the polyisoprene is maleinized. The temperature of the mass decreases gradually in the mixing zone and the maleinized polyisoprene is finally extruded from the extrusion orifice.

The polyisoprene mass is allowed to react in the continuous mixer with at least 0.1 phr (phr = parts by weight per 100 parts by weight of polyisoprene) and not more than 20 phr of maleic anhydride. The maleic anhydride is supplied as a solution in an organic solvent, for example, as a 10 percent by weight to 30 percent by weight solution in acetone or chloroform. It is preferred to react the polyisoprene mass with quantities of maleic anhydride between 0.5 and 7.5 phr.

It is also possible to make a master batch of maleinized polyisoprene, i.e., a polyisoprene which has reacted with more maleic anhydride than is desirable for the conversion of the reaction product thus obtained into a thermoplastic rubber. This master batch is then extended with nonmaleinized polyisoprene to adjust the content of maleic anhydride to the desired value.

The assumption may be made that the maleinization of polyisoprene proceeds along a free radical reaction system. Starting from this view, it is of importance to take those measures which may have the tendency of promoting the formation of free radicals. Presumably mastication seems to be very conducive to the formation of free radicals. It is preferred, therefore, that the contact of the maleic anhydride solution with the polyisoprene takes place during, or immediately subsequent to, the mastication of the polyisoprene mass. It is also possible to stimulate the free radical formation by adding a peroxide, a hydrazide or a diazo-compound to the reaction mixture of polyisoprene with maleic anhydride. Such stimulating agents are normally used in an amount of from 0.001 to 0.5 phr. Although the desired radical concentration in the polyisoprene mass may be readily achieved by mastication, it may be sometimes advantageous to use stimulating agents of the nature referred to above in the mastication of the polyisoprene mass in order to increase the free radical concentration. When conducting the maleinization reaction in the solid phase in a continuous mixer, a higher throughput of the polyisoprene mass can be maintained and a higher production per unit of time can be attained with a given continuous mixer by using compounds, such as peroxide, a hydrazide or a diazo-compound, which may additionally form free radicals.

In the process according to the invention the product obtained by reacting polyisoprene with maleic anhydride is contacted with at least one salt of a divalent metal of the Groups II and IV of the Periodic Table of the elements with a saturated or unsaturated fatty acid containing 10 to 20 carbon atoms. Salts which fulfill this definition provide, presumably during their contact with the polyisoprene-maleic anhydride adduct, divalent metal ions which are likely to be able to cross-link the maleinized polymer chains. If this is true, the adduct is converted into a so-called ionomer which has the properties of a thermoplastic rubber as hereinbefore defined. The divalent metal salt may be used together with one or more metal compounds which contain bound metals being of the same kind as that present in the divalent metal salts, but are not salts of a fatty acid containing 10 to 20 carbon atoms. The divalent metal salts may also be used together with one or more nonmetal compounds, such as saturated or unsaturated fatty acids containing 10 to 20 carbon atoms or derivatives thereof. However, it is also possible to use instead of the divalent metal salts, their precursors which are compounds from which these divalent metal salts may be formed during their contact with the polyisoprene-maleic anhydride adduct.

The polyisoprene-maleic anhydride adduct is converted into a rubber material which does not show the thermoplastic properties required for the production of articles having a satisfactory stability of shape, when it is contacted with one or more compounds which simultaneously contain one or more bound divalent metals of the same type as that present in the divalent metal salts, but not at least one hydrocarboyloxy group having 10 to 20 carbon atoms. No conversion of the polyisoprene-maleic anhydride adduct into a thermoplastic rubber as hereinbefore defined takes place, when the adduct is contacted with one or more compounds which simultaneously contain one or more hydrocarboyloxy groups having 10 to 20 carbon atoms, but not at least one bound divalent metal of the Groups II and IV of the Periodic Table of the elements.

The invention is based on the insight that a thermoplastic rubber which can be processed in conventional equipment suitable for processing elastomers and thermoplastics may be obtained from a polyisoprene-maleic anhydride adduct by contacting it only with one or more compounds which simultaneously contain both one or more bound divalent metals of the Groups II and IV of the Periodic Table of the elements and one or more hydrocarboyloxy groups having 10 to 20 carbon atoms. The presence of derivatives of saturated and unsaturated fatty acids containing 10 to 20 carbon atoms during this contact is preferred. It is preferred that as divalent metal salts zinc and lead salts of saturated and unsaturated fatty acids containing 10 to 20 carbon atoms, in particular those of stearic acid and oleic acid, are used. Preferred precursors of the divalent metal salts are oxides of the divalent metals and the corresponding fatty acids. As oxides zinc and lead oxide may be used, and as fatty acid stearic acid and oleic acid are preferred. Instead of the divalent metal oxides the corresponding divalent metal carbonates, acetates, and oxalates may be used.

The divalent metal salt or the divalent metal-containing precursor thereof should be used in the process according to the invention in an amount equivalent to 0.1 to 50 moles, preferably 0.3 to 15 moles, of divalent metal per mole of bound maleic anhydride present in the polyisoprene-maleic anhydride adduct. If a fatty acid is used, its amount is preferably in the range of from 1 to 20 percent by weight, in particular from 3 to 5 percent by weight, calculated on the weight of polyisoprene.

The divalent metal salts and their precursors may be contacted with the polyisoprene-maleic anhydride adduct in a solid phase in a mixer, such as a Banbury mixer or a two-roll mill. Various conventional fillers, such as reinforcing fillers: for example, carbon black, such as HAF (high abrasion furnace carbon black), ISAF (intermediate super abrasion furnace carbon black), and silicates; nonreinforcing fillers: for example, whiting; and extender oils may be incorporated into the mixture. The ingredients are mixed together until a homogeneous dispersion is obtained. Depending upon the divalent metal compound used the mixing temperature may vary from 50° to 250° C.

Among the derivatives of saturated and unsaturated fatty acids containing 10 to 20 carbon atoms, which may be used together with the divalent metal salts and their precursors, the amides of these fatty acids, for example, stearic acid and oleic acid, show the effect of enhancing the strength properties and processability of thermoplastic rubber obtained from polyisoprene via its maleic anhydride adduct with at least one divalent metal salt and/or its precursors alone. The best results are obtained by using these amides in an amount in the range of from 1 to 20 phr, in particular from 3 to 10 phr.

The thermoplastic rubber obtained by the process according to the invention can be processed in order to prepare various articles which may be produced in a manner known per se from vulcanized rubber or thermoplastics. Thus, films, fibers, foam, laminates, profiles, tubes, insulation material, and shock absorbers may be produced by molding and extrusion.

The following examples illustrate the invention.

EXAMPLE I

In order to prepare a polyisoprene-maleic anhydride adduct use was made of a continuous mixer, as described in the foregoing. The length of the mixer was 21.5 times the diameter D. The various zones of the mixer: the supply zone, the transportation zone, the blister zone, and the mixing zone, had a length of 1.5×D, 7×D, 1×D, and 12×D, respectively. The transport screw had a compression ratio of 1:1.5.

A feed in the form of strips of cis 1,4-polyisoprene was fed into the feed port. The cis 1,4-polyisoprene had a cis 1,4-content of 92 percent and an intrinsic viscosity (I.V.) of 6 dl./g. A solution of 1 part by weight of maleic anhydride (MA) in 4 parts by weight of acetone was injected through the injection opening.

In the transportation zone of the continuous mixer the polyisoprene mass was heated at a temperature of 230° C. After the plastified polyisoprene mass had passed the blister zone, it came into the mixing zone in which the maleic anhydride solution injected through the injection opening was intimately mixed with the hot polyisoprene mass which was subjected to mastication by means of the gear shaped mixing elements. In the mixing zone the temperature of the polyisoprene mass decreased gradually from 230° to 190° C. for a mean residence time of 7 minutes, in which the polyisoprene was maleinized. The maleinized polyisoprene was discharged from the extrusion orifice and subsequently cooled gradually from 190° C. to room temperature.

Three polyisoprene-maleic anhydride adducts were prepared having MA-contents of 0.7, 2.1, and 4.2 phr (phr = parts by weight per 100 parts by weight of polyisoprene) with an intrinsic viscosity (I.V.) of 1.7, 1.8, and 2.0 dl./g., respectively.

All the intrinsic viscosity values mentioned in this Example and those described below were determined in toluene at 25° C.

From a polyisoprene-maleic anhydride adduct (IRMA) having a MA (maleic anhydride) content of 0.7 phr and an I.V. of 1.7 dl./g. four compositions were made by mixing the ingredients in a Brabender Plastograph (cup content: 60 grams; speed: 56 r.p.m.) as described in Rubber Age, Vol. 90, No. 4, Jan. 1962, pages 611–617, in accordance with the mixing scheme as indicated in Table I. The ingredients and the amounts in which they were mixed are mentioned in Table II. The compositions obtained are indicated in Tables I and II by the numbers 1, 2, 3, and 4. From these compositions 1, 2, 3, and 4 slabs having a thickness of 2.5 mm. were made according to ASTM D15 at the following conditions: time: 5 minutes; temperature: 150° C. The properties of the compositions mentioned in Table II were determined according to ASTM D412 (die C).

The values mentioned in Table II show that the addition of only zinc oxide or only ISAF carbon black to the polyisoprene-maleic anhydride adduct did not convert it into a rubber material having satisfactory strength properties. It was impossible to prepare from compositions 1 and 3 articles having a satisfactory stability of shape. When using zinc oxide together with stearic acid, however, the adduct was converted into a rubber product having the same strength properties as a vulcanizate, although it was not vulcanized. The use of the reinforcing filler, ISAF, together with zinc oxide and stearic acid resulted in to a composition 4 which showed improved strength properties in comparison with composition 3.

TABLE I

Mixing scheme using a Brabender Plastograph For each composition:
total mixing time 20 minutes; mixing temperature 180° C.

| Composition No. | 1 | 2 | 3 | 4 |
|---|---|---|---|---|
| | Time in Min. | Time in Min. | Time in Min. | Time in Min. |
| IRMA (MA: 0.7 phr and I.V.: 1.7 dl./g.) added after | 0 | 0 | 0 | 0 |
| Zinc oxide added after | 1 | 1 | – | 1 |
| Stearic acid added after | – | 1½ | – | 1½ |
| ISAF added after | – | – | 1 | 2 |

TABLE II

| Composition | | 1 | 2 | 3 | 4 |
|---|---|---|---|---|---|
| IRMA (MA: 0.7 phr and I.V. 1.7 dl./g.) | phr | 100 | 100 | 100 | 100 |
| Zinc oxide | phr | 5 | 5 | 0 | 5 |
| Stearic acid | phr | 0 | 3 | 0 | 3 |
| ISAF | phr | 0 | 0 | 48 | 48 |
| Slabs pressed for 5 mins. at 150° C. | | | | | |
| Tensile strength | kg./cm.² | <1 | 40 | <1 | 150 |
| Modulus 500% | Kg./cm.² | <1 | 5 | <1 | 90 |
| Elongation at Break | % | 730 | 1,000 | 750 | 600 |
| Tension set at Break | % | >100 | 20 | >100 | 27 |

EXAMPLE II

A polyisoprene-maleic anhydride adduct (IRMA) having an MA-content of 0.7 phr and an I.V. of 1.7 dl./g. was prepared in the same manner as described in Example I. From this adduct various compositions were made using a mixing two-roll mill A or an internal mixer together with a sheeting two-roll mill B.

The mixing two-roll mill A had a capacity of about 200 grams. The rolls had a length of 20 cm. and a diameter of 8 cm. The front roll was driven with a speed of 14 r.p.m. The friction ratio of the rolls amounted to 1:1.2.

The internal mixer was of the Banbury type and had a capacity of about 2 liters. The kneading screws of the mixer rotated with a friction ratio of 1:1.1 in which the one which was driven had a speed of 95 r.p.m. During the mixing of the ingredients a ram pressure of 5 kg./cm.² was maintained. After mixing the mixture was dumped and sheeted off by means of the sheeting two-roll mill B.

The sheeting two-roll mill B had a capacity of about 4 kg. The rolls had a length of 70 cm. and a diameter of 30 cm. The two rolls rotated with a friction ratio of 1:1.4 in which the back roll was driven with a speed of 20 r.p.m.

The ingredients were mixed in accordance with the mixing scheme as indicated in Table III. The ingredients and the amounts in which they were mixed are mentioned in Table IV. The compositions obtained are indicated in Tables III and IV by number. From these compositions slabs having a thickness of 2.5 mm. were made according to ASTM D15 at the following conditions: time: 10 minutes; temperature: 115° C. Except for the hardness, the properties of the compositions mentioned in Table IV were determined according to ASTM D412 (die C). The hardness was determined according to ASTM D2240–64T:

TABLE III.—MIXING SCHEME

| Composition number | 5 | 6 | 7 | 8 | 9 | 10 | 11 | 12 | 13 | 14 | 15 | 16 | 17 | 18 |
|---|---|---|---|---|---|---|---|---|---|---|---|---|---|---|
| | Ingredients added after a time (min.) of — | | | | | | | | | | | | | |
| IRMA | 0 | 0 | 0 | 0 | 0 | 0 | 0 | 0 | 0 | 0 | 0 | 0 | 0 | 0 |
| Stearoylamide | | 1 | ½ | ½ | 1 | 1 | 1 | | 1 | | | | | |
| Stearic acid | | | | | | | | | | | | ½ | ½ | |
| Zinc oxide | 1 | 4 | 1½ | | 3 | 3 | 3 | 1 | 3 | | | | | |
| Magnesium oxide | 3 | 6 | 2 | 1½ | 3 | | | | | | | | | |
| Calcium oxide | | | | | | 3 | | | | | | | | |
| Lead oxide | | | | | | | 3 | | | | | | | |
| Zinc stearate | | | | | | | | 1 | 3 | | | | | |
| Calcium stearate | | | | | | | | | | 1 | | | | |
| Magnesium stearate | | | | | | | | | | | 1 | 1 | | |
| Lead stearate | | | | | | | | | | | | | 1 | |
| Black (HAF) | | | | | | | | | | | | | | 1 |
| Dump after a time (min.) of | | | 3 | 2¼ | | | | | | | | | | |
| Total mixing time (min.) in two-roll mill A | 11 | 9 | | | 9 | 11 | 13 | 15 | 12 | 19 | 9 | 16 | 15 | 11 |
| Mixing temperature. (° C.) in two-roll mill A | 110 | 110 | 160 | 160 | 150 | 150 | 150 | 150 | 150 | 150 | 135 | 180 | 180 | 150 |
| Dump temperature. (° C.) | | | | | | | | | | | | | | 155 |

| Composition number | 19 | 20 | 21 | 22 | 23 | 24 | 25 | 26 | 27 | 28 | 29 | 30 |
|---|---|---|---|---|---|---|---|---|---|---|---|---|
| | Ingredients added after a time (min.) of— | | | | | | | | | | | |
| IRMA | 0 | 0 | 0 | 0 | 0 | 0 | 0 | 0 | 0 | 0 | 0 | 0 |
| Stearoylamide | | ½ | ½ | ½ | ½ | | ½ | ½ | ½ | ½ | ½ | ½ |
| Stearic acid | | | | | | | | | | | | |
| Zinc oxide | 1½ | 1½ | 1½ | 1½ | 1½ | 1½ | 1½ | 1½ | 1½ | 1½ | 1½ | 1½ |
| Magnesium oxide | 1½ | 1½ | 1½ | 1½ | 1½ | 1½ | 1½ | 1½ | 1½ | 1½ | 1½ | 1½ |
| Calcium oxide | | | | | | | | | | | | |
| Lead oxide | | | | | | | | | | | | |
| Zinc stearate | | | | | | | | | | | | |
| Calcium stearate | | | | | | | | | | | | |
| Magnesium stearate | | | | | | | | | | | | |
| Lead stearate | | | | | | | | | | | | |
| Black (HAF) | | | | | | | 1½ | 1½ | 1½ | 1½ | 1½ | 1½ |
| Dump after a time (min.) of | 3 | 3 | 3 | 3 | 3 | 3 | 3 | 3 | 3 | 3 | 3 | 3 |
| Total mixing time (min.) in two-roll mill A | | | | | | | | | | | | |
| Mixing temp. (° C.) in two-roll mill A | | | | | | | | | | | | |
| Dump temp. (° C.) | 150 | 150 | 150 | 150 | 150 | 150 | 150 | 150 | 150 | 150 | 150 | 150 |

TABLE IV

| Composition number | 5 | 6 | 7 | 8 | 9 | 10 | 11 | 12 | 13 | 14 | 15 | 16 | 17 | 18 |
|---|---|---|---|---|---|---|---|---|---|---|---|---|---|---|
| IRMA, phr | 100 | 100 | 100 | 100 | 100 | 100 | 100 | 100 | 100 | 100 | 100 | 100 | 100 | 100 |
| Stearoylamide, phr | 0 | 5 | 5 | 5 | 5 | 5 | 5 | 0 | 5 | 0 | 0 | 0 | 0 | 0 |
| Stearic acid, phr | 0 | 0 | 0 | 0 | 0 | 0 | 0 | 0 | 0 | 0 | 0 | 5 | 5 | 0 |
| Zinc oxide, phr | 3 | 3 | 3 | 0 | 3 | 3 | 3 | 3 | 3 | 0 | 0 | 0 | 0 | 0 |
| Magnesium oxide, phr | 5 | 5 | 5 | 5 | 5 | 0 | 0 | 0 | 0 | 0 | 0 | 0 | 0 | 0 |
| Calcium oxide, phr | 0 | 0 | 0 | 0 | 0 | 0.5 | 0 | 0 | 0 | 0 | 0 | 0 | 0 | 0 |
| Lead oxide, phr | 0 | 0 | 0 | 0 | 0 | 0 | 1.7 | 0 | 0 | 0 | 0 | 0 | 0 | 0 |
| Zinc stearate, phr | 0 | 0 | 0 | 0 | 0 | 0 | 0 | 13.8 | 13.8 | 0 | 0 | 0 | 0 | 0 |
| Calcium stearate, phr | 0 | 0 | 0 | 0 | 0 | 0 | 0 | 0 | 0 | 38.6 | 0 | 0 | 0 | 0 |
| Magnesium stearate, phr | 0 | 0 | 0 | 0 | 0 | 0 | 0 | 0 | 0 | 0 | 37 | 37 | 0 | 0 |
| Lead stearate, phr | 0 | 0 | 0 | 0 | 0 | 0 | 0 | 0 | 0 | 0 | 0 | 0 | 18 | 0 |
| Black (HAF), phr | 0 | 0 | 0 | 0 | 0 | 0 | 0 | 0 | 0 | 0 | 0 | 0 | 0 | 12.5 |
| Slabs pressed for 10 mins. at 100° C.: | | | | | | | | | | | | | | |
| Tensile strength, kg./cm.² | 50 | 125 | 125 | 25 | 125 | 53 | 50 | 80 | 110 | 30 | 30 | 74 | 135 | 150 |
| Modulus 300%, kg./cm.² | 9 | 10 | 10 | 5 | 10 | 9 | 12 | 7 | 11 | 8 | 19 | 14 | 16 | 11 |
| Modulus 500%, kg./cm.² | 17 | 16 | 16 | 10 | 16 | 17 | 25 | 13 | 20 | 11 | | 22 | 26 | 22 |
| Modulus 700%, kg./cm.² | | | | | | | | | | 16 | | 40 | 52 | 43 |
| Elongation at break, percent | 810 | 1,040 | 1,040 | 910 | 1,040 | 700 | 600 | 980 | 950 | 1,050 | 330 | 930 | 940 | 930 |
| Set at break, percent | 20 | 15 | 15 | 14 | 15 | 11 | 5 | 6 | 19 | 132 | 4 | 41 | 23 | 11 |
| Hardness, Shore A | 17 | 28 | 28 | 16 | 28 | 13 | 22 | 20 | 27 | 23 | 15 | 28 | 32 | 24 |

| Composition number | 19 | 20 | 21 | 22 | 23 | 24 | 25 | 26 | 27 | 28 | 29 | 30 |
|---|---|---|---|---|---|---|---|---|---|---|---|---|
| Polyisoprene-maleic anhydride adduct, phr | 100 | 100 | 100 | 100 | 100 | 100 | 100 | 100 | 100 | 100 | 100 | 100 |
| Stearoylamide, phr | 0 | 5 | 7½ | 10 | 15 | 0 | 1 | 3 | 5 | 7½ | 10 | 15 |
| Stearic acid, phr | 3 | 3 | 3 | 3 | 3 | 3 | 3 | 3 | 3 | 3 | 3 | 3 |
| Zinc oxide, phr | 5 | 5 | 5 | 5 | 5 | 5 | 5 | 5 | 5 | 5 | 5 | 5 |
| Magnesium oxide, phr | 0 | 0 | 0 | 0 | 0 | 0 | 0 | 0 | 0 | 0 | 0 | 0 |
| Calcium oxide, phr | 0 | 0 | 0 | 0 | 0 | 0 | 0 | 0 | 0 | 0 | 0 | 0 |
| Lead oxide, phr | 0 | 0 | 0 | 0 | 0 | 0 | 0 | 0 | 0 | 0 | 0 | 0 |
| Zinc stearate, phr | 0 | 0 | 0 | 0 | 0 | 0 | 0 | 0 | 0 | 0 | 0 | 0 |
| Calcium stearate, phr | 0 | 0 | 0 | 0 | 0 | 0 | 0 | 0 | 0 | 0 | 0 | 0 |
| Magnesium stearate, phr | 0 | 0 | 0 | 0 | 0 | 0 | 0 | 0 | 0 | 0 | 0 | 0 |
| Lead stearate, phr | 0 | 0 | 0 | 0 | 0 | 0 | 0 | 0 | 0 | 0 | 0 | 0 |
| Black (HAF), phr | 0 | 0 | 0 | 0 | 0 | 50 | 50 | 50 | 50 | 50 | 50 | 50 |
| Slabs pressed for 10 mins. at 110° C.: | | | | | | | | | | | | |
| Tensile strength, kg./cm.² | 50 | 125 | 135 | 95 | 80 | 165 | 190 | 200 | 165 | 155 | 110 | 130 |
| Modulus 300%, kg./cm.² | 13 | 16 | 20 | 15 | 20 | 100 | 135 | 150 | 105 | 110 | 90 | 90 |
| Modulus 500%, kg./cm.² | | | | | | | | | | | | |
| Modulus 700%, kg./cm.² | | | | | | | | | | | | |
| Elongation at break, percent | 710 | 1,040 | 1,000 | 950 | 900 | 700 | 700 | 700 | 700 | 650 | 600 | 700 |
| Set at break, percent | 20 | 15 | 15 | 20 | 25 | 30 | 30 | 20 | 30 | 25 | 30 | 35 |
| Hardness, Shore A | 17 | 28 | 22 | 32 | 35 | 40 | 50 | 53 | 52 | 55 | 57 | 53 |

Compositions Nos. 5, 6, 9–18 were made using the mixing two-roll mill A. Compositions Nos. 7, 8, 19–30 were made using an internal mixer of the Banbury type together with the sheeting two-roll mill B.

From the values mentioned in Table IV it appears that polyisoprene could be converted into rubber products having strength properties which were comparable with those of a vulcanizate, without vulcanizing the compositions given in the Table, by using maleic anhydride and stearates of zinc, calcium, magnesium, and lead, or the corresponding oxides together with stearic acid. Furthermore, Table IV demonstrates the synergistic effect of stearoylamide on the strength properties of the products when using it in an amount of not more than 20 phr and together with one or more compounds containing simultaneously both a divalent metal such as zinc, and a hydrocarboyloxy group, such as stearoyloxy group. If stearoylamide was used together with zinc oxide without stearic acid (composition No. 8), the strength properties of the rubber product were not satisfactory. When using more than 20 phr of stearoylamide, it appeared that it acted as a plasticizer.

EXAMPLE III

This example demonstrates the effect of the MA-content of the polyisoprene-maleic anhydride adduct on the strength properties of products obtained by contacting the adduct with stearoylamide, zinc oxide, stearic acid, and HAF-black.

Three polyisoprene-maleic anhydride adducts having MA-contents of 0.7, 2.1, and 4.2 phr with I.V. values of 1.7, 1.8, and 2.0 dl./g., respectively, were prepared in the same manner as described in Example I.

The compositions were made using an internal mixer as described in Example II, together with a sheeting two-roll mill as indicated by B in Example II.

The ingredients were mixed in accordance with the mixing scheme indicated in Table V, and the amounts in which they were mixed are mentioned in Table VI.

TABLE V

| | |
|---|---|
| IRMA added after | 0 min. |
| Stearoylamide added after | ½ min. |
| Stearic acid added after | 1½ min. |
| Zinc oxide added after | 1½ min. |
| HAF-black added after | 1½ min. |
| Dump after | 4 min. |
| Dump temperature | 195° C. |

From the compositions obtained, slabs having a thickness of 2.5 mm. were made according to ASTM D15 at the following conditions: time: 15 min.; temperature: 110° C. Except for the hardness, the properties of the compositions mentioned in Table VI were determined according to ASTM D412 (die C). The hardness was determined according to ASTM D2240–64T.

TABLE VI

| Composition No. | | 31 | 32 | 33 |
|---|---|---|---|---|
| IRMA | phr | 100 | 100 | 100 |
| MA-content in IRMA | phr | 0.7 | 2.1 | 4.2 |
| Stearoylamide | phr | 5 | 5 | 5 |
| Zinc oxide | phr | 5 | 5 | 5 |
| Stearic acid | phr | 3 | 3 | 3 |
| HAF-black | phr | 50 | 50 | 50 |
| Slabs pressed for 15 min. at 110° C. | | | | |
| Tensile strength | kg./cm.² | 155 | 180 | 130 |
| Modulus 300% | kg./cm.² | 60 | 105 | - |
| Modulus 500% | kg./cm.² | 105 | 170 | - |
| Elongation at break | % | 800 | 520 | 290 |
| Set at break | % | 30 | 16 | 4 |
| Hardness | Shore A | 53 | 64 | 73 |

Table VI shows that the use of maleic anhydride in amounts in the range of from 0.5 to 7.5 phr led to optimum results with respect to the strength properties of the thermoplastic rubber prepared.

EXAMPLE IV

This example demonstrates the flow properties of compositions 6 and 18 mentioned in Table IV at various temperatures. The flow properties were determined by means of the Instron Tester as described in ASTM Bulletin 232, Sept. 1958. The Instron Tester used had a capillary tube having a ratio of length to diameter of 40 and an entrance angle of 90°. The results of the tests are summarized in Table VII.

TABLE VII

| | Composition No. | | | |
|---|---|---|---|---|
| | 6 | 18 | 6 | 18 |
| Shear rate (sec.⁻¹) | 10 | | 100 | |
| At 125° C.: | | | | |
| Apparent viscosity (poises) of | $3 \times 10^5$ | $2 \times 10^5$ | $1 \times 10^5$ | $5 \times 10^4$ |
| At shear stress (dynes/cm.²) of | $3 \times 10^6$ | $2 \times 10^6$ | $1 \times 10^7$ | $5 \times 10^6$ |
| At 150° C.: | | | | |
| Apparent viscosity (poises) of | $2.5 \times 10^6$ | $1.5 \times 10^5$ | $5 \times 10^4$ | $3 \times 10^4$ |
| At shear stress (dynes/cm.²) of | $2.5 \times 10^6$ | $1.5 \times 10^6$ | $5 \times 10^6$ | $3 \times 10^6$ |
| At 175° C.: | | | | |
| Apparent viscosity (poises) of | $2.5 \times 10^5$ | $8 \times 10^4$ | $4 \times 10^4$ | $2 \times 10^4$ |
| At shear stress (dynes/cm.²) of | $2.5 \times 10^6$ | $8 \times 10^5$ | $4 \times 10^6$ | $2 \times 10^6$ |
| At 200° C.: | | | | |
| Apparent viscosity (poises) of | $1 \times 10^5$ | $4.5 \times 10^4$ | $3 \times 10^4$ | $1.0 \times 10^4$ |
| At shear stress (dynes/cm.²) of | $1 \times 10^6$ | $4.5 \times 10^5$ | $3 \times 10^6$ | $1.0 \times 10^6$ |

From the values mentioned in Table VII it appears that the compositions 6 and 18 had the flow properties of a thermoplastic at temperatures of 125° C. and higher. This means that these compositions can be processed in the conventional equipments suitable for processing thermoplastics. After cooling, the compositions regained their strength and elastomeric properties as mentioned in Table IV.

We claim as our invention:

1. A process for preparing a novel thermoplastic rubber, which comprises reacting polyisoprene with maleic anhydride in an amount of from 0.1 to 20 percent by weight, calculated on the weight of polyisoprene, in the absence of water and without effecting any vulcanization, contacting the reaction product thus obtained with an agent of the group consisting of (1) at least one salt of a divalent metal of the Groups II and IV of the Periodic Table of the elements with a fatty acid containing 10 to 20 carbon atoms, and (2) compounds from which this divalent metal salt may be formed during their contact with the polyisoprene-maleic anhydride reaction product, the agent being present in an amount equivalent to 0.1 to 50 moles of divalent metal per mole of bound maleic anhydride.

2. A process as claimed in claim 1, in which polyisoprene is reacted with maleic anhydride by feeding the polyisoprene to a mixer, masticating the polyisoprene therein at a temperature between 50° C. and 300° C., and injecting into the polyisoprene at a point in time from immediately subsequent to mastication to any time during the mastication, a solution of maleic anhydride, the polyisoprene being reacted with maleic anhydride.

3. A process as claimed in claim 2, in which the polyisoprene is masticated in the mixer at a temperature between 150° C. and 250° C. for a time between 30 seconds and 30 minutes.

4. A process according to claim 1, in which the polyisoprene-maleic anhydride adduct is contacted not only with at least one divalent metal salt or its precursors, but also with 1–20 phr of at least one amide of a fatty acid containing 10 to 20 carbon atoms.

5. A process as claimed in claim 4, in which an amide of oleic acid is used.

6. A novel thermoplastic rubber prepared according to the process of claim 1.

7. A novel thermoplastic rubber as claimed in claim 6, in which the divalent metal is zinc or lead.

8. A novel thermoplastic rubber as claimed in claim 6, in which the divalent metal is present in an amount in the range of from 0.3 to 15 moles per mole of bound maleic anhydride.

9. A process according to claim 1, in which the polyisoprene-maleic anhydride adduct is contacted with a zinc or lead salt of saturated or unsaturated fatty acid containing 10 to 20 carbon atoms.

* * * * *